INVENTOR
ISADORE LUDWIN
BY Morse, Altman + Oates
ATTORNEYS

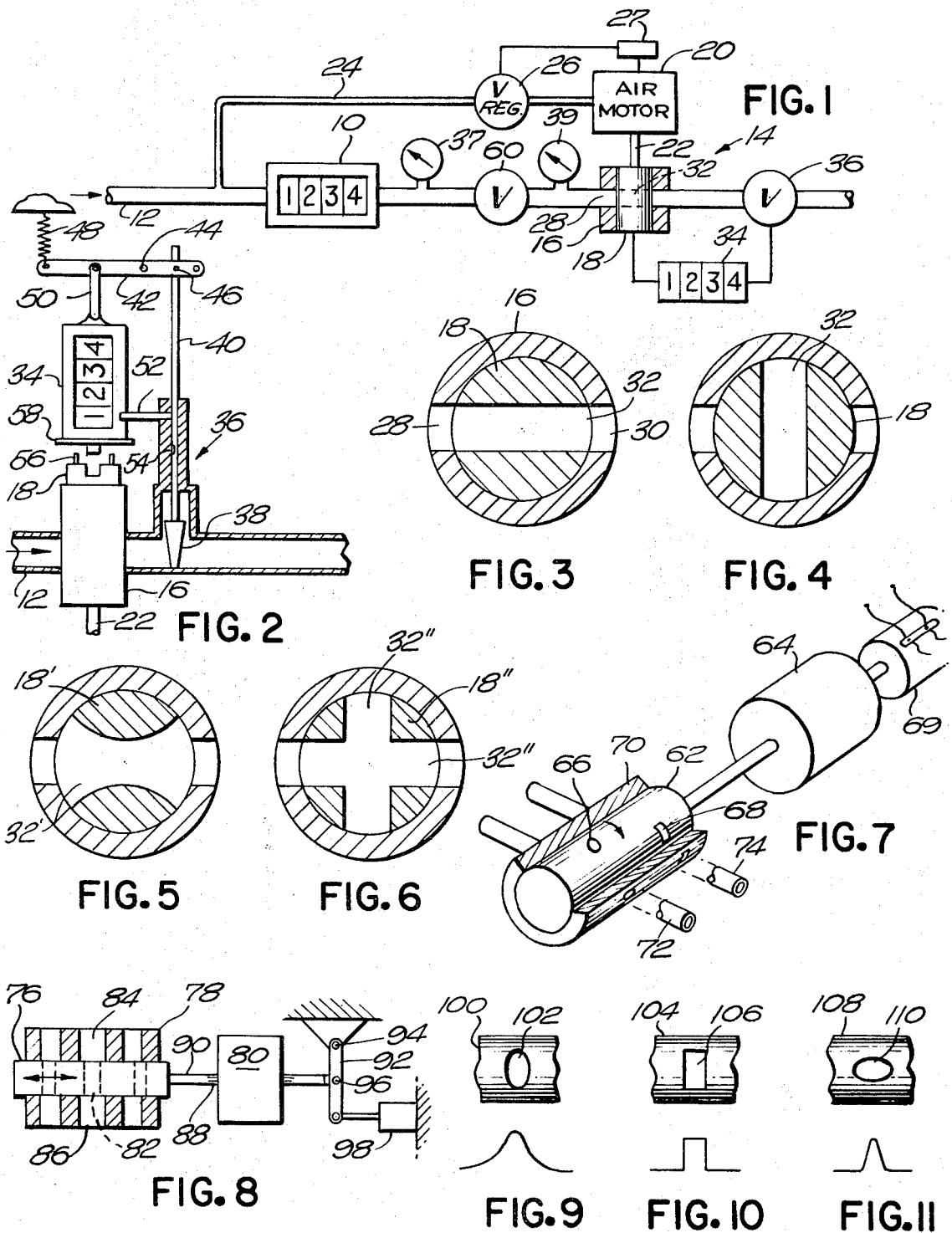

United States Patent Office 3,538,741
Patented Nov. 10, 1970

3,538,741
FLUID CONTROL SYSTEM
Isadore Ludwin, 1073 Centre St.,
Newton Center, Mass. 02159
Continuation-in-part of application Ser. No. 426,771,
Jan. 21, 1965. This application Aug. 7, 1968, Ser.
No. 750,875
Int. Cl. G01f 3/24, 25/00
U.S. Cl. 73—3                                6 Claims

ABSTRACT OF THE DISCLOSURE

A fluid control system is provided for metering fluids by converting a steady fluid flow into a series of uniform pulses and counting the pulses. The system is particularly useful in calibrating conventional fluid meters. A rotary valve is employed which cyclically opens and closes to pass the fluid in pulse form through the line. A cutoff valve is operatively connected to the counter to terminate the flow at the end of each counting period and the counter reading is compared with that of the fluid meter.

CROSS-REFERENCE TO RELATED APPLICATIONS

This is a continuation-in-part of my U.S. application Ser. No. 427,771, filed Jan. 21, 1965 under the title "Fluid Treatment System."

BACKGROUND OF THE INVENTION

Field of the invention

This invention relates generally to the metering of fluids and fluid control and more particularly is directed towards a novel method and associated apparatus for controlling and measuring fluid flow. A novel rotary valve is employed as a pulse generator.

Description of the prior art

Calibration techniques for fluid meters normally rely upon a precision reference meter of the same type as the field meter.

Heretofore, meters have been calibrated by coupling a reference meter to the regular field meter to measure the flow accurately and to compare the reading of the reference meter with that on the field meter. The equipment involved in transfer testing field meters customarily is heavy, complicated, expensive and inaccurate and usually requires electrical leads to operate components. This latter feature is undesirable particularly where measuring inflammables.

It is an object of the present invention to provide improvements both in the method and apparatus for measuring and controlling fluid flow and also for calibrating meters, and more particularly to provide a simple, low-cost method and apparatus for calibrating meters which measure fluid volume. It is another object of this invention to provide a novel apparatus for producing fluid pulses having precisely defined characteristics as to amplitude, duration and shape. It is a further object of the invention to provide novel means for sequencing a number of fluid channels as well as synchronizing them selectively with electrical switches and the like.

SUMMARY OF THE INVENTION

This invention features a novel method of calibrating a field meter which measures the volume of a fluid flowing in a line, comprising the steps of producing and counting a train of uniform fluid pulses each of known volume. These pulses are produced from the fluid which has already passed through the field meter and are then counted to indicate a total fluid volume which is then compared with the volume indicated by the field meter. From this the percentage error of the field meter may be calculated. When used for calibrating meters the system employs a fluid pulse generator having a rotary valve drivingly connected to a counter and a cutoff valve which is operated by the counter upon generating a predetermined number of pulses. When used as a primary meter a direct volume reading can be recorded by an appropriate counter.

The rotary valve comprises a valve body having at least an inlet and an outlet port and a cylindrical core rotatably mounted within the body. The core is formed with at least one transverse passage through which the fluid passes upon registration with the body ports. One set of housing ports and their associated core passage form a channel for fluid when aligned to form an open path. The ports and the passage may be formed in various configurations so as to produce various fluid pulse shapes. The core may also be shifted axially to alter the pulse characteristics.

BRIEF DESCRIPTION OF THE DRAWINGS

FIG. 1 is a schematic diagram of a meter calibrating system made according to the invention, FIG. 2 is a detailed view on an enlarged scale, partly broken away, of the pulse counter and cutoff valve, FIGS. 3 and 4 are cross-sectional views of the rotary valve showing the valve core in different positions, FIGS. 5 and 6 are views similar to FIGS. 3 and 4 but showing modifications thereof, FIG. 7 is a fragmentary view in perspective, partly broken away, showing a modified form of the rotary valve, FIG. 8 is a plan view, partly in section, showing a modification of the rotary valve, FIGS. 9, 10 and 11, are fragmentary views in front elevation showing core passages of various cross-sectional shapes and associated with each is a representation of the wave shape produced by the particular core passage and its associated ports, and, FIGS. 12–17 are fragmentary sectional views showing further modifications of the rotary valve.

DESCRIPTION OF THE PREFERRED EMBODIMENTS

Figure 12:
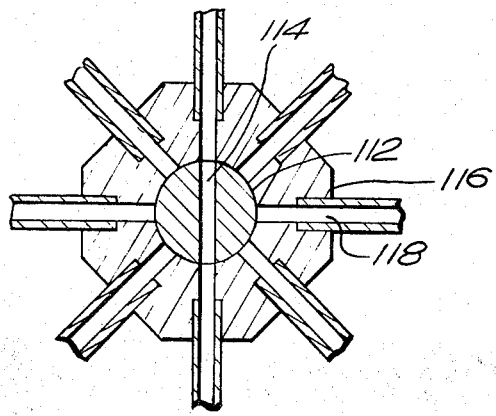

Referring now to FIG. 1 of the drawings there is shown a system for calibrating a field meter 10 installed in a conduit 12 through which a fluid, such as gas or the like, is flowing. The meter 10 may be of any conventional type which presents a recorded tabulation in discrete units corresponding to the amount of fluid passing through the meter. Since the field meter 10 may produce erroneous readings, particularly after a long period of installation and continued use, it is a common practice to periodically test the meter 10 by determining the percentage error. This may be done by removing the meter 10 from the line, bringing it to a shop and comparing its performance with a master meter. Another technique is by transfer testing in which a calibrated reference meter is used to check the accuracy of the field meter. In the latter case, the reference meter is connected to the line of the field meter so that the same volume of fluid is passed through both. By comparing the volume as measured by the field meter and as measured by the reference meter, the accuracy of the field meter can be determined.

The latter technique, while not requiring removal of the installed meter, nevertheless is quite time consuming and the equipment now employed is limited, heavy, complicated and expensive. According to the present invention, the field meter 10 remains in place and its accuracy is checked at various operating pressures by changing the flow of fluid through the field meter into a train of identical pulses and then counting the pulses. The percent error of the field meter may thereby be calculated. Each pulse generated is uniform in volume and pressure so that a known amount of fluid is passed through the line per pulse. As shown in FIG. 1, a pulse generator 14 is connected in the line 12 and comprises a valve body 16 having a fully rotatable core 18 mounted therein. The core 18 is rotated at constant speed by a suitable driving means such as an air motor 20 connected to the core by means of a shaft 22 and the motor 20 may be driven by line pressure through a by-pass 24 having a pressure regulator 26. A speed governor 27 may be provided for the motor with a feed back connection to the pressure regulator 26 for maintaining constant speed on the motor. The valve body 16 is provided with inlet and outlet ports 28 and 30 adapted to register with a passage 32 formed diametrically through the core 18. As best shown in FIGS. 3 and 4, the core 18 rotates 360° so that its passage 32 cyclically registers with the ports 28 and 30 each half cycle. Thus the fluid in the line will be pulsed by rotation of the core. The pulses are counted by connecting a counting device 34 to the core 18 which device may be any one of a number of commercially available items and may be either mechanical or electronic, the mechanical mode being preferred where inflammable fluids are being measured. In any event, the counter 34 presents a display of the number of pulses passed through the line and is operatively connected to a quick closing cutoff 36 connected in the line 12. The function of the valve 36 is to stop the flow in the line immediately upon a predetermined number of pulses having been generated and counted. Thus the flow through the field meter 10 is stopped and its reading is compared with the reading on the counter 34.

Thermometers 37 and 39 may be provided to determine the difference, if any, between the temperature of the fluid at the field meter and at the pulse generator. If the temperature is the same, no correction is required. If the temperatures are different, reference may be made to suitable tables for the necessary corrections.

Referring more particularly to FIG. 2 there are shown details of a cutoff valve and triggering arrangement which may be employed. The valve 36 may be of gate type having a gate 38 mounted on the end of a stem 40 adapted to be raised or lowered by means of an arm 42 pivoted at pin 44 and drivingly connected to the stem by means of a pivot connection 46. The arm 42 is normally biased in a clockwise direction by means of a spring 48 fixed at one end and connected to the left-hand end of the lever arm 42 at the other end so that the gate 38 is normally urged downward. A link 50 connects the counter 34 to the lever arm 42. The counter 34 is provided with a latch 52 formed at the stem 40. The latch 52 is operated by the counter and pulls the latch out of engagement with the notch upon the counter reaching a predetermined number. The gate and the stem are normally held in a raised position with the latch engaging the notch and the valve 36 being open. In this position the counter 34 also is in engagement with the valve core 18 of the pulse generator so that rotation of the core is tabulated on the counter. When the desired number of pulses are passed through the line the counter 34 will cause the latch 52 to disengage the notch and under the force of the spring 48 the valve gate 38 will quickly close. At the same time the lever 42 will pull the counter 34 out of engagement with the core 18 thus stopping the count. Both the flow of fluid and the count are stopped simultaneously and the count on the counter 34 may be compared with the count on the meter 10 which also will have stopped by the closing of the valve 36. The connection between the counter 34 and the core 18 comprises a pair of driving prongs 56 on the core which engage cooperating slots (not shown) formed in a driving ring 58 on the counter 34.

In order to maintain constant pressure on the line while the calibration is being carried out a pressure regulator 60 is provided. The pressure may be set by adjusting the regulator and thereby calibrate at different operating pressures. In place of the mechanism for stopping the counter and stopping the flow upon completion of the count as shown in FIG. 2 other techniques may be employed. For example, a solenoid may be employed to close the valve, the solenoid being actuated either by a mechanical counter or by an electronic counter. Other variations may also be employed.

In place of straight mechanical counting being the reference factor the count may also be made on a time basis. In such an embodiment the pulse generator may be set to deliver pulses at a precise rate, such as 100 pulses per minute and operated by means of a precision timer for a predetermined period, such as 10 minutes. Thus in each 10 minute calibration run 1,000 pulses will be generated totalling a known gas volume at a given set pressure. The timer may be made to start on command and shut off automatically after 1,000 pulses or any other predetermined number has been reached.

Volume per pulse may be set over wide limits by means of an appropriate regulator. Pulse volume can vary widely since pressure settings ranging from a few inches of water to 30 p.s.i. or more may be used. The effects of changes in atmospheric pressure may be corrected by reference to a suitable chart or table. Because of this wide range, the meter calibrating method and system may be used on small or large meters by changing the setting of the pressure regulator and/or counting more pulses.

The power source to turn the rotary valve core may be gas line pressure or compressed air or an electric motor which ever is more convenient. If the gas line pressure is 20 p.s.i. or more, then no outside source of power is normally needed.

Referring now more particulraly to FIGS. 5 and 6, there are shown modifications of the pulse generator, and in the FIG. 5 embodiment of valve core 18' is formed with a passage 32' which is enlarged at its ends whereby the flow time or pulse length will be increased over that possible with the pulse generator of FIGS. 3 and 4, assuming both are operated at the same speed and other conditions are constant. In the FIG. 6 embodiment, a valve core 18" is formed with double intersecting passages 32". This configuration doubles the number of pulses passed through the valve for each cycle of the core.

In FIG. 7 there is shown a pulse generator in which a core 62, driven by a motor 64, is formed with multiple passages 66 and 68 adapted to register cyclically with ports formed in a valve body 70 connected to a pair of conduits 72 and 74. The pasages 66 and 68 may be in the same angular relation to one another or may be out of phase according to the intended use and the results desired. Instead of two passages, the number of passages and conduits obviously may be increased. The pulse generator may be employed for a wide variety of uses not only in applications involving pressurized fluids but also involving vacuum or in any situation where there is a differential in pressure and pulsing is desired. In addition the motor or the core may operate one or more switches as shown at 69 in FIG. 7 to coordinate fluid and electrical systems. It may also be used as a sequence control device for carrying out various operations in predetermined sequence and for concurrent control of fluid and electrical channels.

Referring now to FIG. 8 there is shown a further modification of the invention and in this embodiment a rotary valve core 76 is mounted within a valve body 78 not only for rotation about its axis by means of a motor 80 but also adapted to be shifted axially so as to alter the effective cross-sectional area of its passage 82 in relation to ports 84 and 86 in the valve body. The core may be formed with a series of passages having different axial relationship to their ports. It will be understood that by shifting the core axially the passage 82 may be reduced in cross-sectional area as it moves out of register with the ports and with sufficient axial movement close completely. The volume of each pulse may thus be varied by changing the size of the channel while in operation. The valve core 76 may be axially shifted as by means of a splined connection 88 between the motor 80 connecting rod 90 and by means of a lever arm 92 pivoted to a fixed support at 84 engaging the end of the rod 90 at pivot point 96 and at its lower end being drivingly connected to an actuating mechanism 98 such as a solenoid or a power cylinder adapted to bias the lever arm 92 and thus axially shift the core 76. Alternatively the core may remain axially fixed while the housing is shifted.

Referring now to FIGS. 9, 10 and 11, there are shown modified configurations for the passage cross-section in order to obtain pulses having different wave shapes. In FIG. 9 a valve core 100 is formed with a passage 102 which is generally elliptical in cross-section. Such a passage together with a housing port of similar shape will generate a pulse of relatively long duration, as compared to a circle, as represented by the wave illustrated below the core. In FIG. 10 a core 104 is formed with a passage 106 of rectangular cross-section and with a slotted port this will generate a pulse having a substantially square shape as illustrated. In FIG. 11 a core 108 is formed with an elliptical cross-sectional passage 110 oriented perpendicularly to that of FIG. 9 and this with a similarly shaped port will generate a pulse of shorter duration with a different shape. The pulse length may be increased or decreased by controlling the speed of rotation and amplitude controlled by pressure. Various other wave shapes may be achieved by forming passages and ports of various cross-sectional configurations and by combining different ports and passages.

Figure 16:
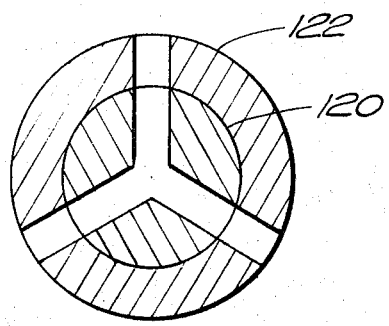

Various other improvements may be made to the rotary timing valve. For example, in FIG. 12 a core 112 is formed with a single passage 114 across its diameter whereas a valve body 116 is provided with a number of evenly spaced radial ports 118 all in the same plane. This arrangement performs functions similar to a number of the FIG. 3 type valve. Some of the ports may be connected to air or oxygen lines, for example, and the rotation of the core will result in delivery of gas to opposing ports in timed sequence. Another symmetrical arrangement is shown in FIG. 16 and in this embodiment a core 120 is formed with three evenly spaced radial passages and a valve body 122 is formed with three evenly spaced ports which may be connected in various ways to cyclically pass a fluid medium at a rate of three cycles per rotation of the core.

Figure 13:
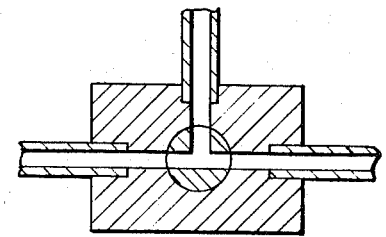
Figure 14:
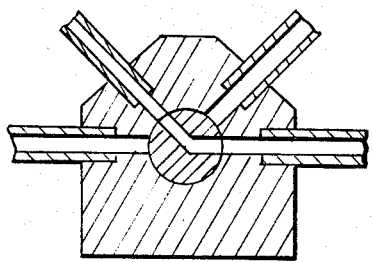
Figure 15:
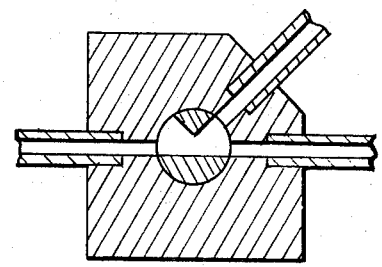
Figure 17:
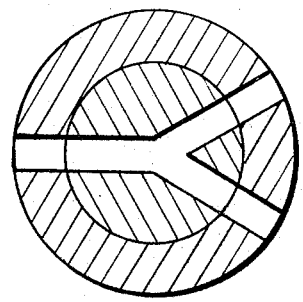

FIGS. 13, 14, 15 and 17 show asymmetrical arrangements with FIG. 13 showing a core having radial passages in the form of a T for cyclical registration with three discharge ports at 90° intervals. FIG. 14 shows another asymmetrical arrangement which is formed with a single passage having radial potrions disposed at an obtuse angle and adapted to register first with one pair of obtusely angled ports and then another pair of obtusely angled ports. FIG. 15 shows a core having a rather enlarged passage whereby rotation of the core starting from the illustrated position, communicates with the ports in a variety of combinations depending on the phase of the cycle. FIG. 17 shows a core with radial passages two of which are 60° apart while the remaining passage is 150° from either adjacent passage. The valve body is formed with ports similarly positioned. This type of valve is useful in providing even distribution of an entering fluid medium to separate discharge ports or combining two fluids into one discharge.

The pulse generator may be used as a basic component of an interrupted orifice flow meter since it enables measurement of volume per unit time. In operation certain factors must be held constant to insure an accurate reading. These include the pressure gradient of the fluid passing through the meter, the size of the channel through which the fluid is passing, the shape of the pulses generated, the frequency of these pulses and finally the fluid must be the same throughout.

Corrections must be made for any difference in the temperature of the counted pulse and the volume measured by the field meter. Also corrections must be made for atmospheric pressure changes which will affect the measurement.

In addition to calibrating meters the invention may be employed for other purposes such as metering, proportioning, controlling fluid flow, mixing fluids, balancing fluid flow, coordinating and sequencing. The invention may be employed as a primary meter wherein a steady fluid flow is converted into a train of fluid pulses and the pulses are counted.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention what I claim and desire to obtain by Letters Patent of the United States is:

1. The method of measuring fluid flow, comprising the steps of:
    (a) regulating said fluid flow at a known pressure,
    (b) converting said fluid flow into a train of discrete uniform pulses, each pulse being of known pressure and volume, and,
    (c) counting said pulses and stopping said flow after a predetermined number of said pulses.

2. The method of claim 1 including the steps of passing said fluid through a volumetric meter and comparing the reading on said meter with the pulse count to calibrate said meter.

3. A system for calibrating meters and the like installed in a conduit through which a fluid is flowing comprising:
    (a) valve means in line with said meter for pressure regulating the fluid and providing sufficient flow therethrough,
    (b) a flow through fluid pulse generator in line with said meter and adapted to convert the fluid flow into a train of discrete like pulses,
    (c) a counter operatively connected to said generator for counting said pulses, and,
    (d) means for simultaneously starting and stopping said counter and the fluid flow.

4. A system for metering fluids, comprising:
    (a) a pulse generator adapted to convert a flow of fluid into a train of discrete pulses each of known uniform volume,
    (b) means for delivering said fluid through said generator under known conditions,
    (c) means for counting said pulses, and
    (d) valve means responsive to said counting means for stopping and starting said flow.

5. A system for calibrating meters and the like installed in a conduit through which a fluid is flowing at a steady pressure, comprising:
- (a) a fluid pulse generator in line with said meter and adapted to convert the fluid flow into a train of pulses,
- (b) a counter for counting said pulses, and,
- (c) means for simultaneously starting and stopping said counter and the fluid flow,
- (d) said means including a valve in line with said meter and generator and responsive to said counter to stop and start said flow.

6. A system for metering fluids, comprising:
- (a) an interrupted orifice pulse generator adapted to convert a flow of fluid into a train of discrete pulses each of known uniform duration,
- (b) means for counting said pulses by cycles of said orifice,
- (c) valve means responsive to said counting means for starting and stopping said flow,
- (d) means to compute the volume of each pulse, and,
- (e) means to calculate the total volume of a series of pulses.

References Cited
UNITED STATES PATENTS

| | | |
|---|---|---|
| 3,083,570 | 4/1963 | Truman. |
| 3,098,382 | 7/1963 | Hoffman et al. |
| 3,344,667 | 10/1967 | Maltby. |

LOUIS R. PRINCE, Primary Examiner

H. C. POST III, Assistant Examiner

U.S. Cl. X.R.

73—205